US012763520B2

(12) United States Patent
Chen

(10) Patent No.: US 12,763,520 B2
(45) Date of Patent: Oct. 13, 2026

(54) ELECTRICAL CONNECTOR WITH FLOATING MECHANISM

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 320 days.

(21) Appl. No.: 18/406,534

(22) Filed: Jan. 8, 2024

(65) Prior Publication Data

US 2024/0235115 A1 Jul. 11, 2024

(30) Foreign Application Priority Data

Jan. 9, 2023 (CN) ......................... 202310025981.4

(51) Int. Cl.
*H01R 13/631* (2006.01)
*H01R 13/502* (2006.01)
*H01R 13/6581* (2011.01)

(52) U.S. Cl.
CPC ....... *H01R 13/6315* (2013.01); *H01R 13/502* (2013.01); *H01R 13/6581* (2013.01)

(58) Field of Classification Search
CPC .............. H01R 13/6315; H01R 13/502; H01R 13/6581; H01R 24/50; H01R 4/029; H01R 12/71; H01R 24/00
See application file for complete search history.

(56) References Cited

U.S. PATENT DOCUMENTS 3,364,456 A * 1/1968 Elliott .................... H01R 33/00 439/671
5,516,303 A * 5/1996 Yohn .................. H01R 13/6315 439/248
6,558,177 B2 5/2003 Havener et al.
7,154,042 B2 * 12/2006 Auray .................. H02G 3/0691 439/535
7,485,806 B1 * 2/2009 Gretz .................. H02G 3/0666 174/553
8,105,091 B2 * 1/2012 Nishihira ............... H01R 24/38 439/39
9,595,795 B2 * 3/2017 Lane .................. H01R 13/6456
9,905,968 B2 2/2018 Yanase et al.
(Continued)

FOREIGN PATENT DOCUMENTS

CN 212935027 U 4/2021
CN 109599725 B 7/2021
(Continued)

*Primary Examiner* — Truc T Nguyen
(74) *Attorney, Agent, or Firm* — Ming Chieh Chang

(57) ABSTRACT

An electrical connector includes: an insulating member; an inner conductor and an outer conductor both secured with the insulating member, the outer conductor including an extension; a fixing plate secured to the extension of the outer conductor; and an adapting shell movably confined between the outer conductor and the fixing plate to be moveable about the insulating member.

6 Claims, 17 Drawing Sheets

(56) References Cited

U.S. PATENT DOCUMENTS

| | | | | |
|---|---|---|---|---|
| 11,569,611 | B2 | 1/2023 | Inoue et al. | |
| 11,757,236 | B2 * | 9/2023 | Yamazaki .......... | H01R 12/7082 439/607.34 |
| 2006/0141827 | A1 * | 6/2006 | Auray .................. | H02G 3/0691 439/92 |
| 2007/0190868 | A1 * | 8/2007 | De Cloet ........... | H01R 13/6277 439/851 |
| 2014/0127940 | A1 * | 5/2014 | Wagner .................. | H01R 24/40 439/578 |
| 2021/0013677 | A1 | 1/2021 | Chen et al. | |
| 2023/0238732 | A1 | 7/2023 | Chen | |

FOREIGN PATENT DOCUMENTS

| | | | |
|---|---|---|---|
| EP | 3196987 | A1 | 7/2017 |
| TW | M611190 | U | 5/2021 |

* cited by examiner

ELECTRICAL CONNECTOR WITH FLOATING MECHANISM

BACKGROUND OF THE INVENTION

1. Field of the Invention

The present invention relates to an assembly comprising a first electrical connector and a second mating electrical connector with a floating feature.

2. Description of Related Art

U.S. patent Application Publication No. 2020/0099168 discloses an improved connector assembly ensuring a connector to be fixed to a connector housing with high water-tightness, free of damaging or breaking due to external force, and achieving high shielding performance and reliability. The connector includes a conductive terminal, an intermediate insulating member retaining the terminal, and an outer conductor that is conductive and contains the intermediate insulating member. A mating module side connector which constitutes part of a module includes a mating side inner conductor member and a mating side outer conductor member. The connector assembly is generally not of a floating design and arrangement of the connector and the mating module side connector does not provide good self-alignment mating.

SUMMARY OF THE INVENTION

An electrical connector comprises: an insulating member; an inner conductor and an outer conductor both secured with the insulating member, the outer conductor including an extension; a fixing plate secured to the extension of the outer conductor; and an adapting shell movably confined between the outer conductor and the fixing plate to be moveable about the insulating member.

An electrical connector assembly comprises: a first electrical connector including: an insulating member; an inner conductor and an outer conductor both secured with the insulating member, the outer conductor including an extension; a fixing plate secured to the extension of the outer conductor; and an adapting shell movably confined between the outer conductor and the fixing plate to be moveable about the insulating member; and a second electrical connector including: an outer housing and a contact piece secured to the outer housing; an inner housing received in the outer housing, a contact mounted to the inner housing, and a guiding funnel secured to the inner housing; and an outer shell secured to the outer housing to movably confine the inner housing while keeping the contact in constant touch with the contact piece; wherein the inner conductor of the first electrical connector is adapted to mate with the contact of the second electrical connector.

DETAILED DESCRIPTION OF THE PREFERRED EMBODIMENT

Figure 1:
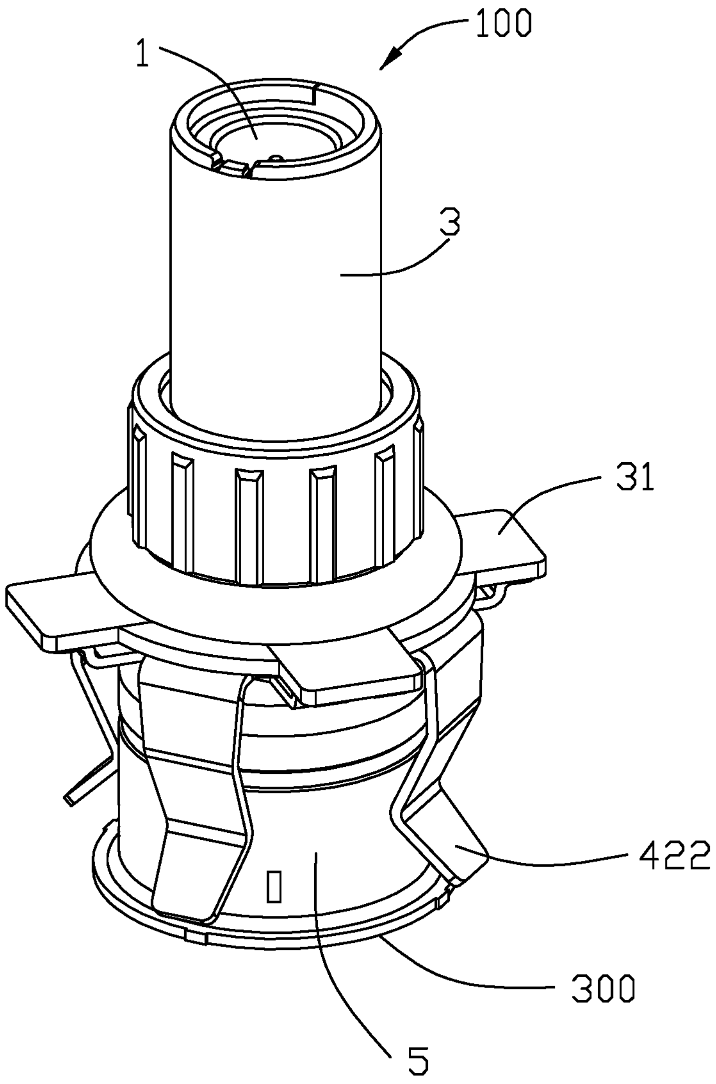
FIG. 1 is a perspective view of an electrical connector in accordance with a first embodiment of the present invention.
Figure 2:
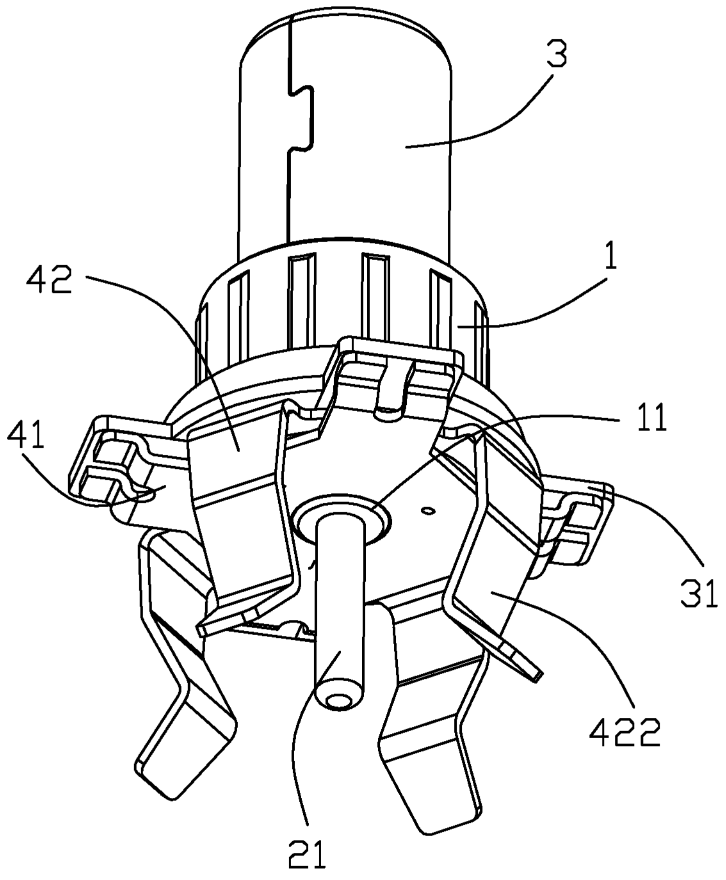
FIG. 2 is another perspective view of the electrical connector.

FIGS. 1-4 show an electrical connector 100 of a first embodiment; FIGS. 5-10 show an electrical connector 200 of a second embodiment; FIGS. 11-14 show an electrical connector assembly 1000 embodied by the electrical connector 200 and a mating electrical connector 300.

Referring to FIGS. 1-17 and especially to FIGS. 1-4, the electrical connector 100 comprises an insulating member 1, an inner conductor 2 and an outer conductor 3 both secured with the insulating member 1, e.g., by insert-molding, a fixing plate 41, and an adapting shell 42. The outer conductor 3 includes an extension 31, e.g., four part being shown, and the fixing plate 41 is secured to the extension 31 of the outer conductor 3. After assembling, the adapting shell 42 is movably confined between the outer conductor 3 and the fixing plate 41 so as to be able to move with respect to the insulating member 1. Specifically, the insulating member 1 has a first end 11 and a second end 12; the inner conductor 2 has a contacting end 21 exposed at the second end 12 for mating the electrical connector 300; the fixing plate 41 has a plurality of legs 411 for fixing to the extension 31. The extension 31 of the outer conductor 3 is located near the first end 11 of the insulating member 1. The adapting shell 42 includes a ring 421 around the contacting end 21, a plurality of outer arms 422, and a plurality of spring fingers 426 inside the ring 421. The ring 421 is movably located and confined by the outer conductor 3 and the fixing plate 41 to be moveable in a direction generally perpendicular to an axial direction of the inner conductor 2. The plurality of outer arms 422 are moveable together with the ring 421 so as not to over-stress the electrical connector 300 when a slight mis-alignment should occur between the electrical connector 200 and the mating electrical connector 300. The plurality of spring fingers 426 provides buffering during movement of the ring 421 by interacting with the first end 11 of the insulating member 1 on one hand and with the ring 421 and/or the fixing plate 41 on the other hand.

Figure 3:
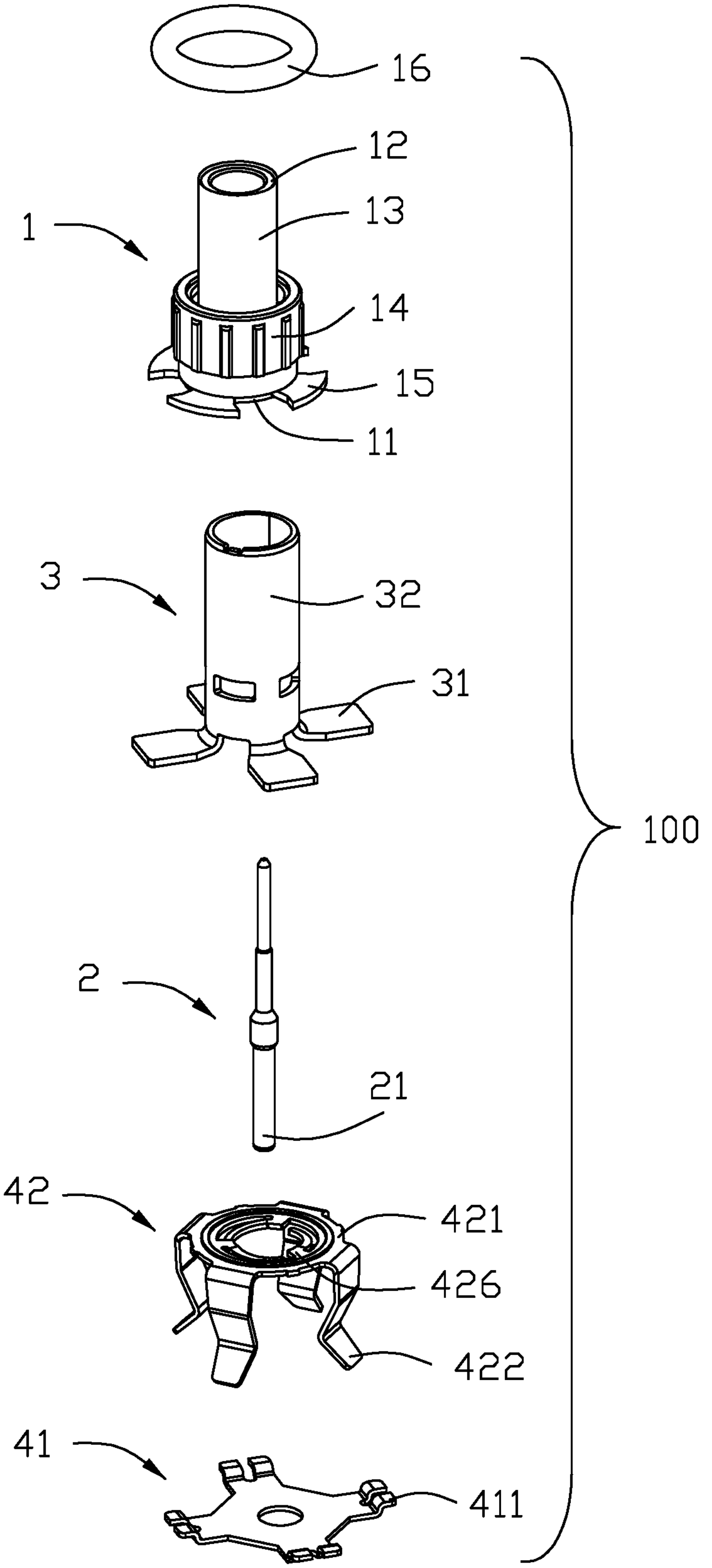
FIG. 3 is an exploded view of the electrical connector.
Figure 4:
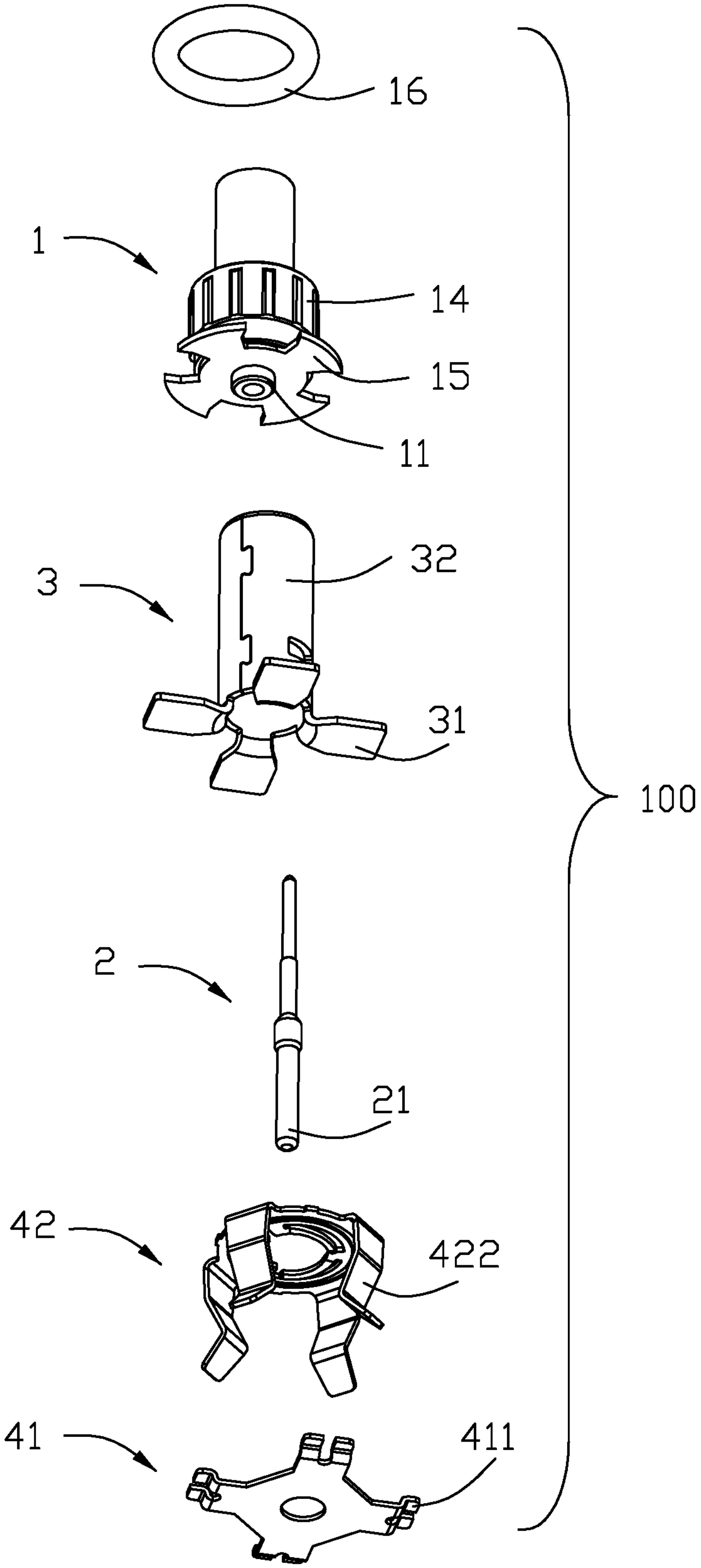
FIG. 4 is another exploded view of the electrical connector.
Figure 5:
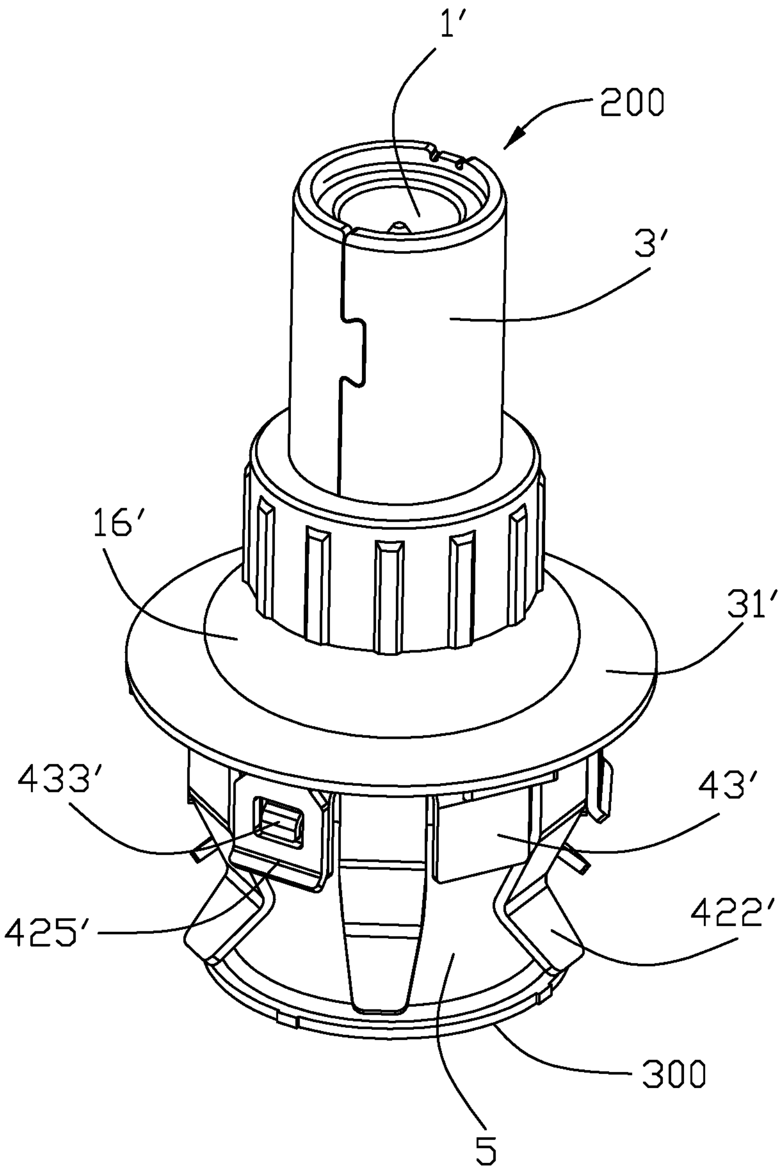
FIG. 5 is a perspective view of an electrical connector in accordance with a second embodiment of the present invention.
Figure 6:
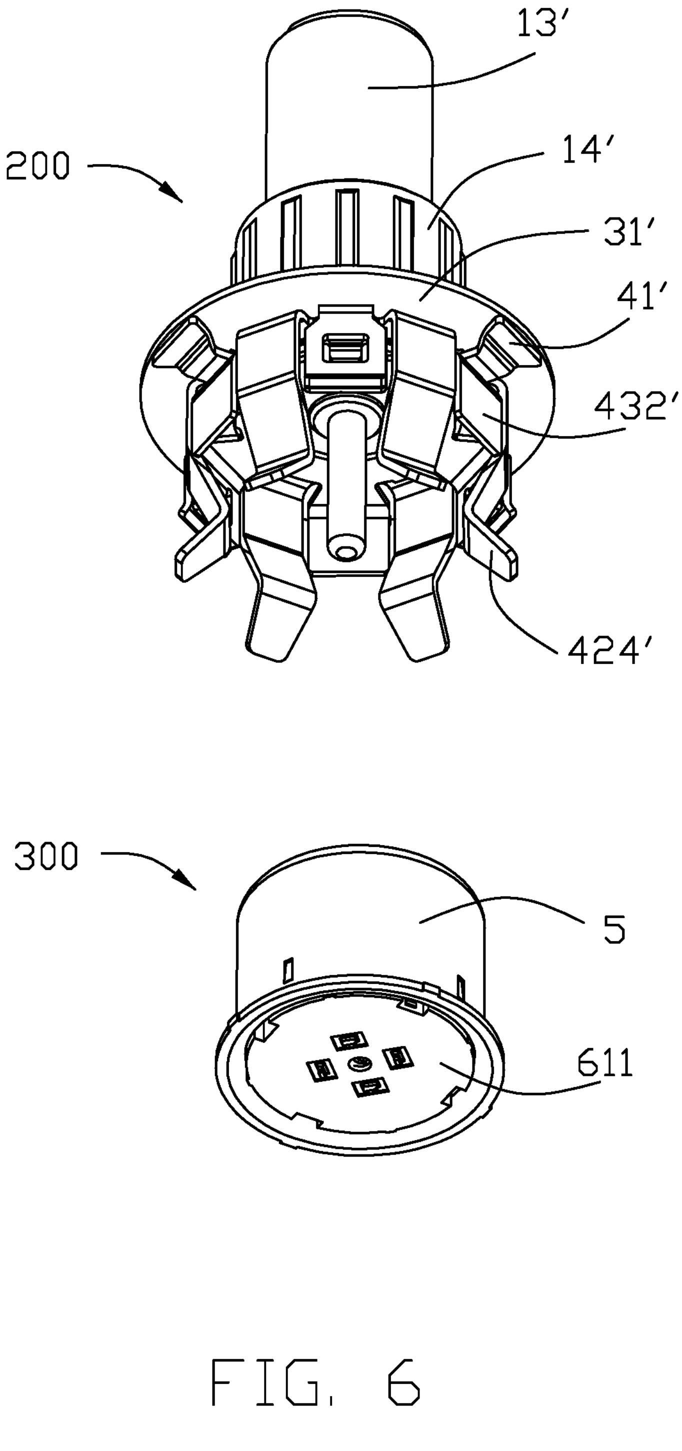
FIG. 6 is another perspective view of the electrical connector of FIG. 5 and a mating electrical connector.
Figure 7:
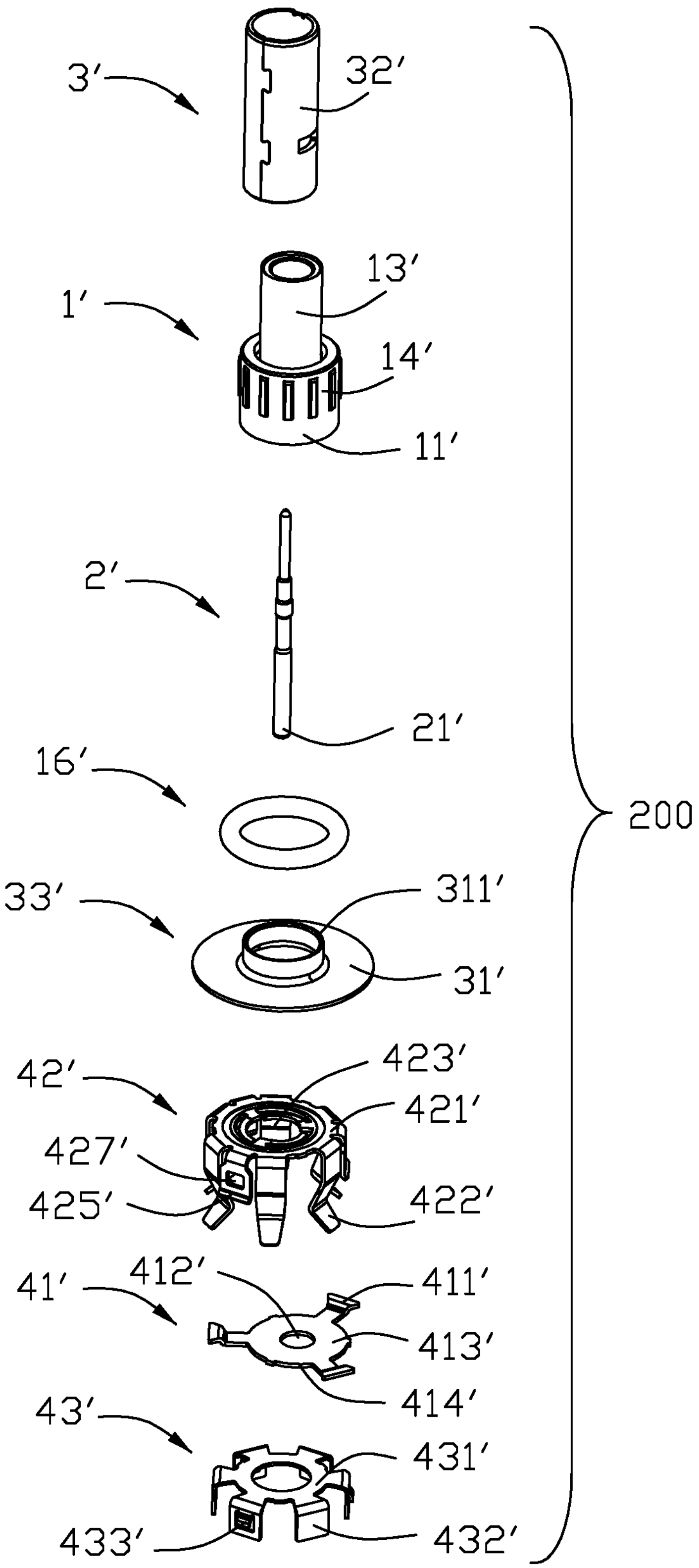
FIG. 7 is an exploded view of the electrical connector of FIG. 5.
Figure 8:
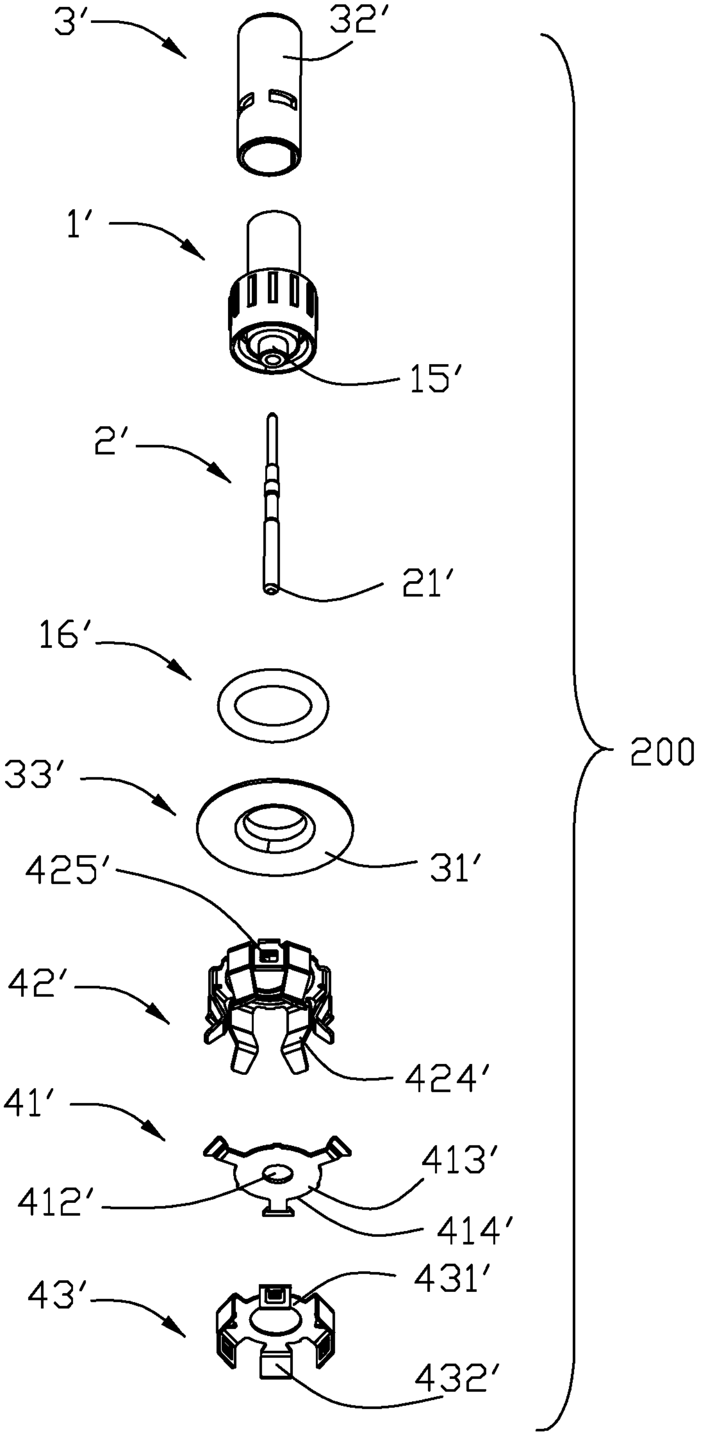
FIG. 8 is a view similar to FIG. 7 but from another perspective.
Figure 9:
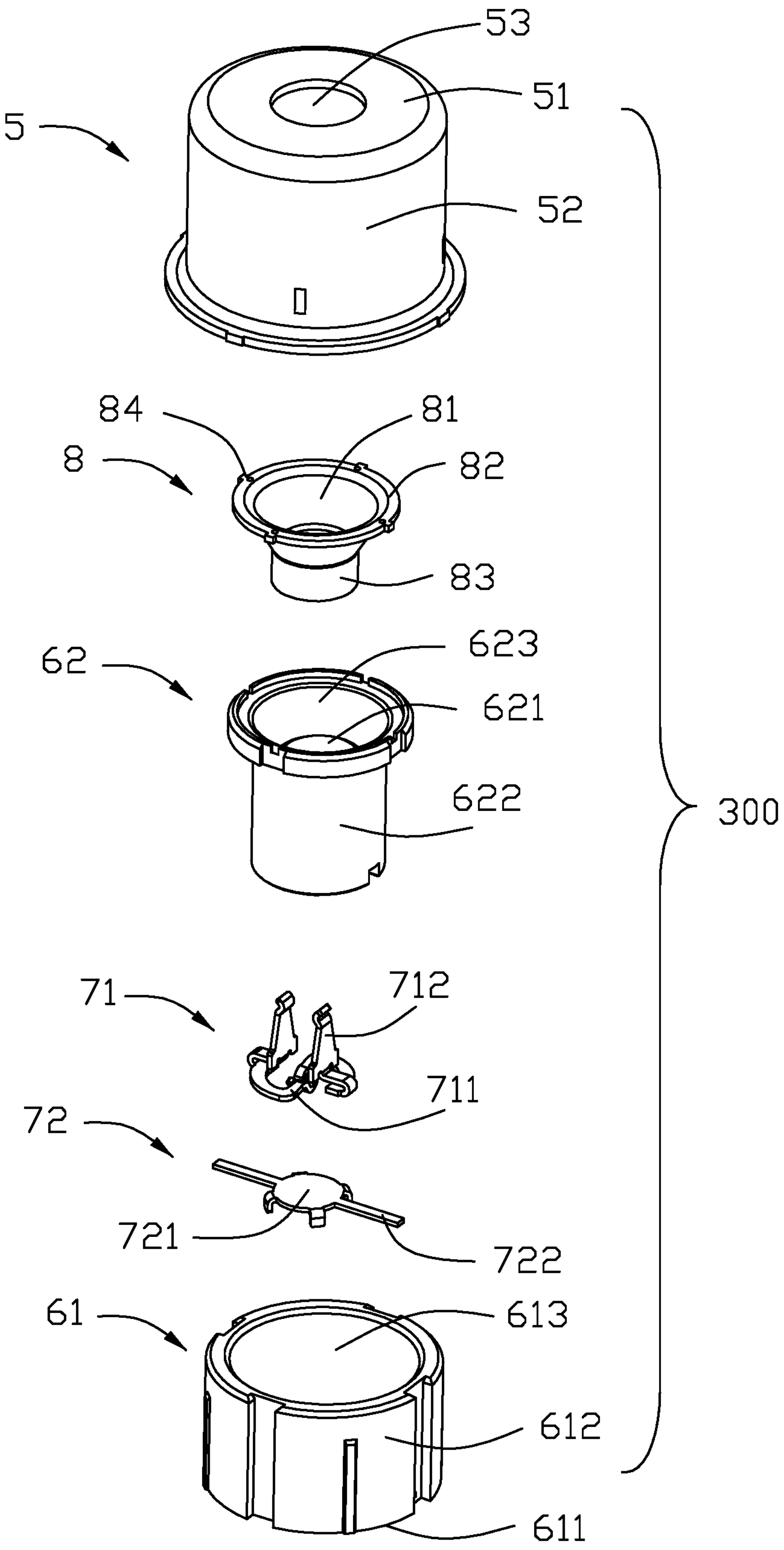
FIG. 9 is a perspective view of the mating electrical connector.
Figure 10:
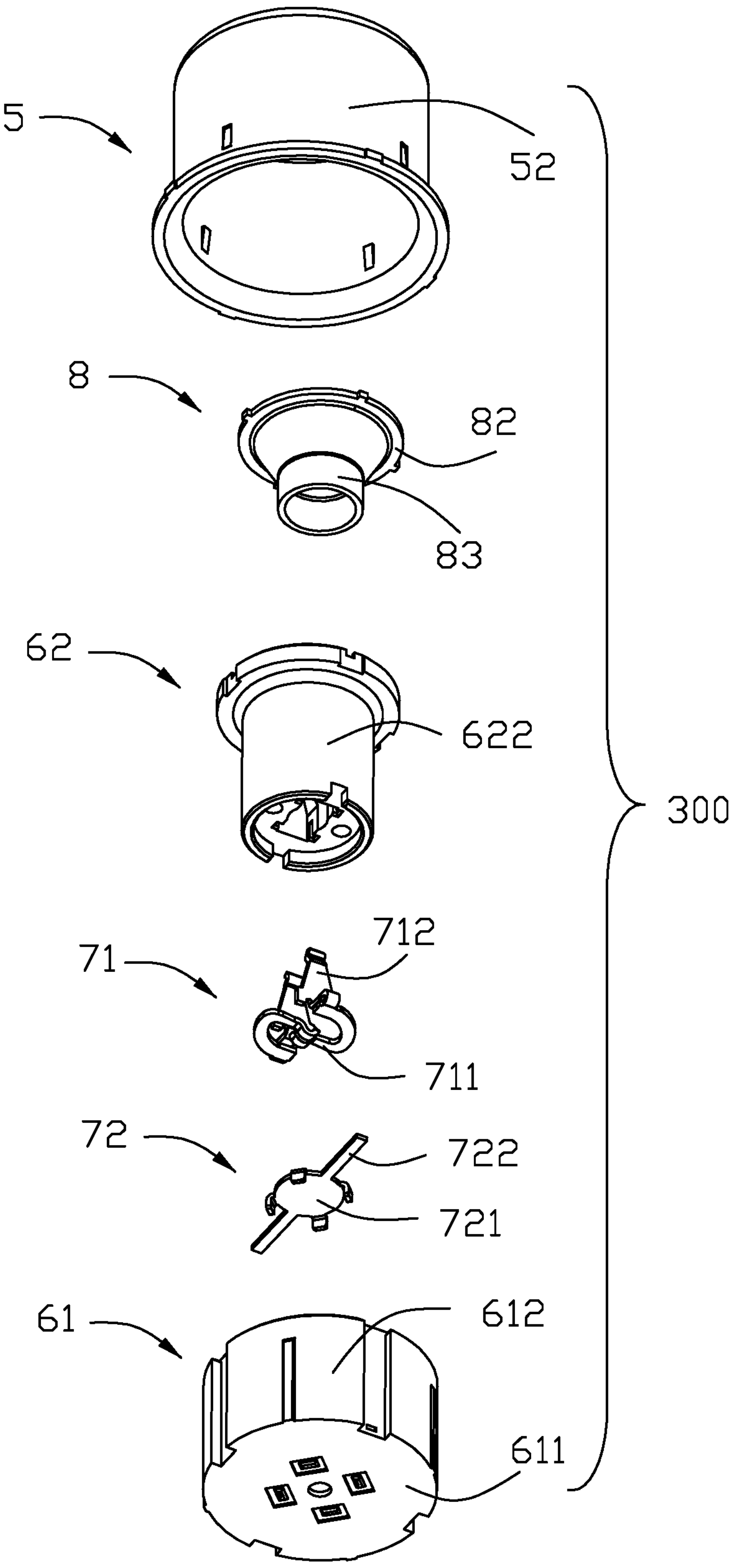
FIG. 10 is a view similar to FIG. 9 but from another perspective.
Figure 11:
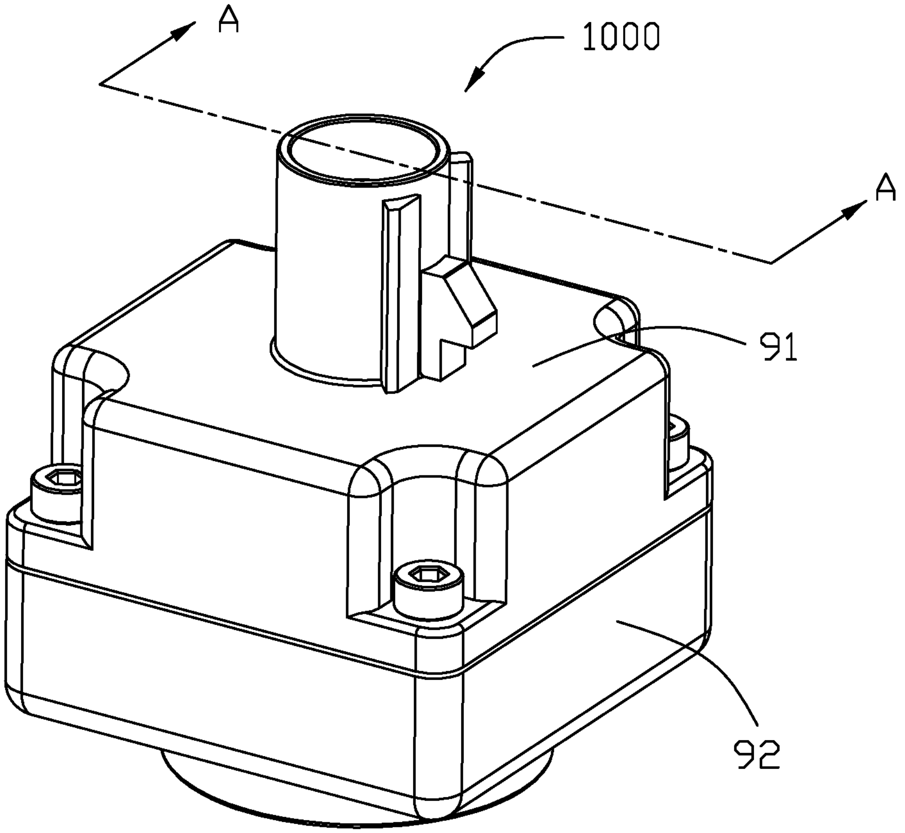
FIG. 11 is a perspective view of the electrical connector of FIG. 5 and the mating electrical connector embodied in an assembly of an adaptor and a coaxial socket.
Figure 12:
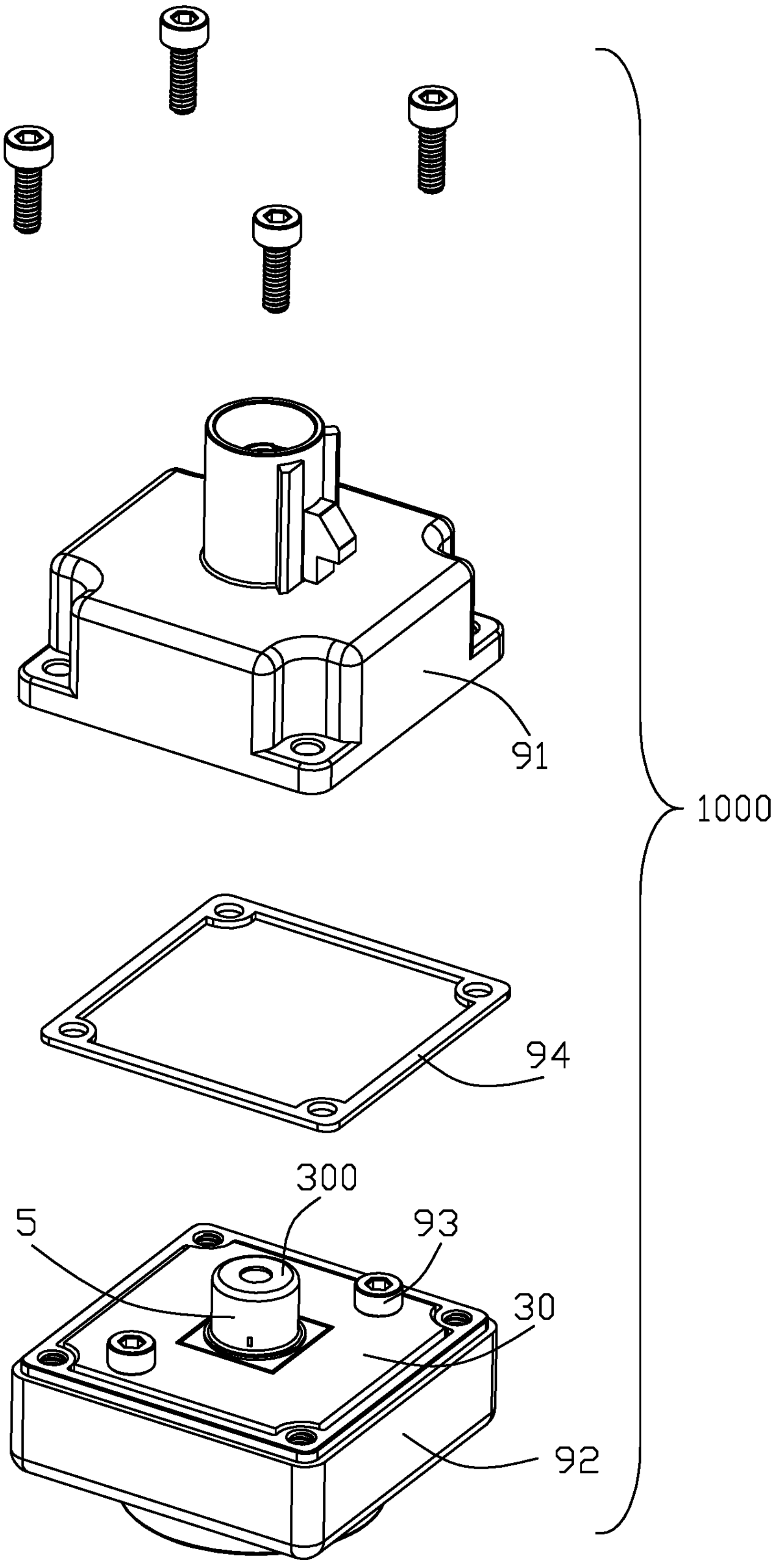
FIG. 12 is an exploded view of the assembly of FIG. 11.
Figure 13:
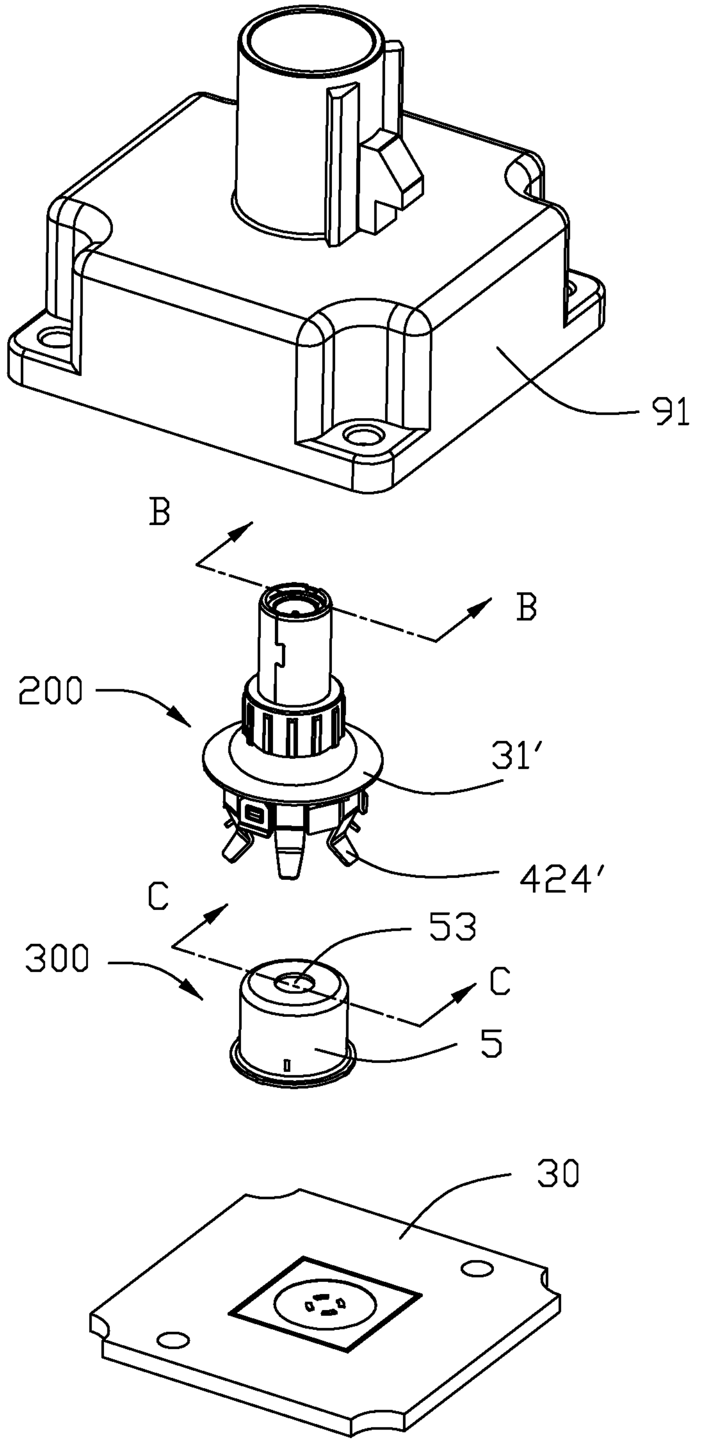
FIG. 13 is an exploded view of a part of the assembly of FIG. 11.
Figure 14:
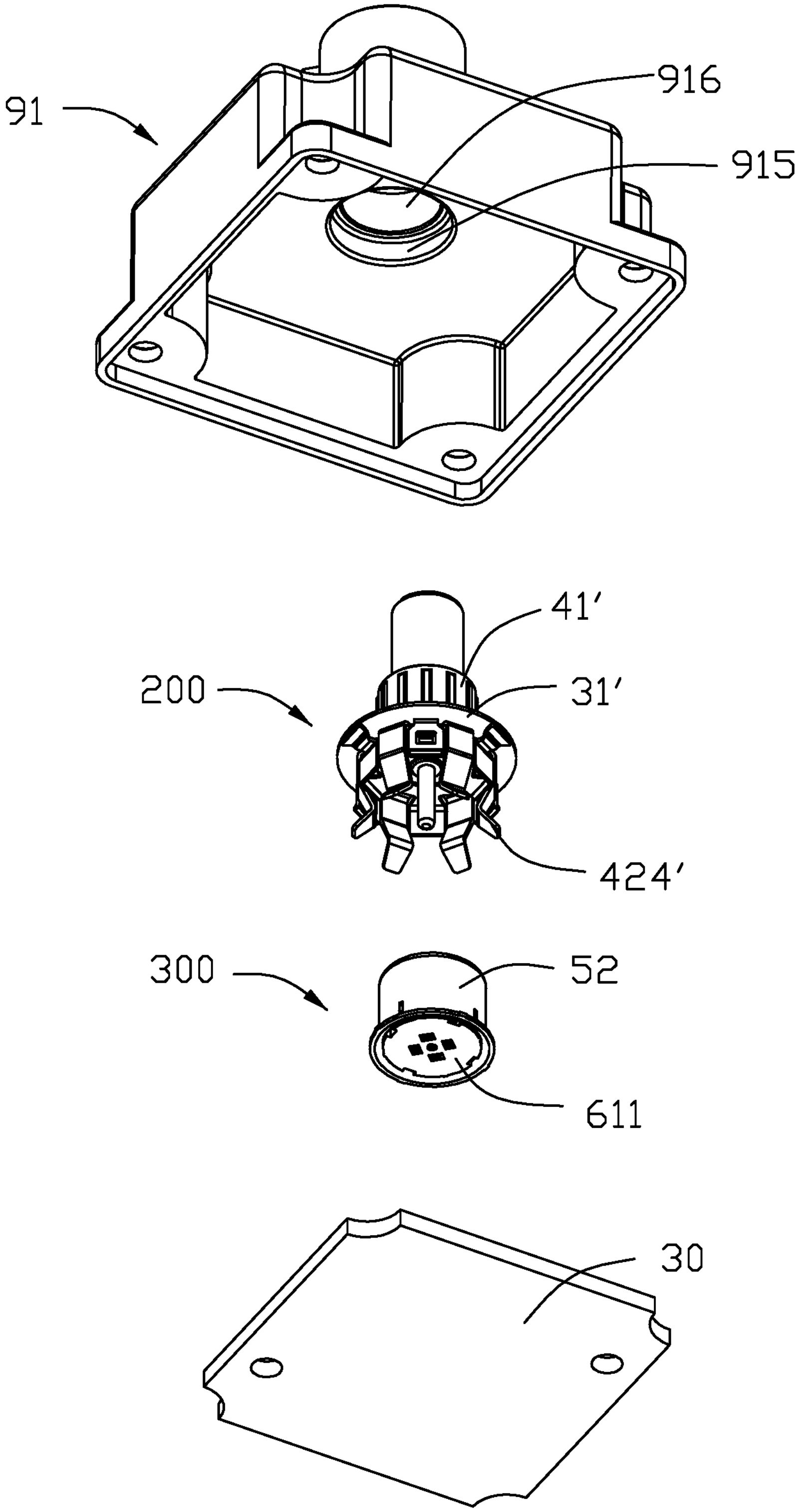
FIG. 14 is a view similar to FIG. 13 but from another perspective.
Figure 15:
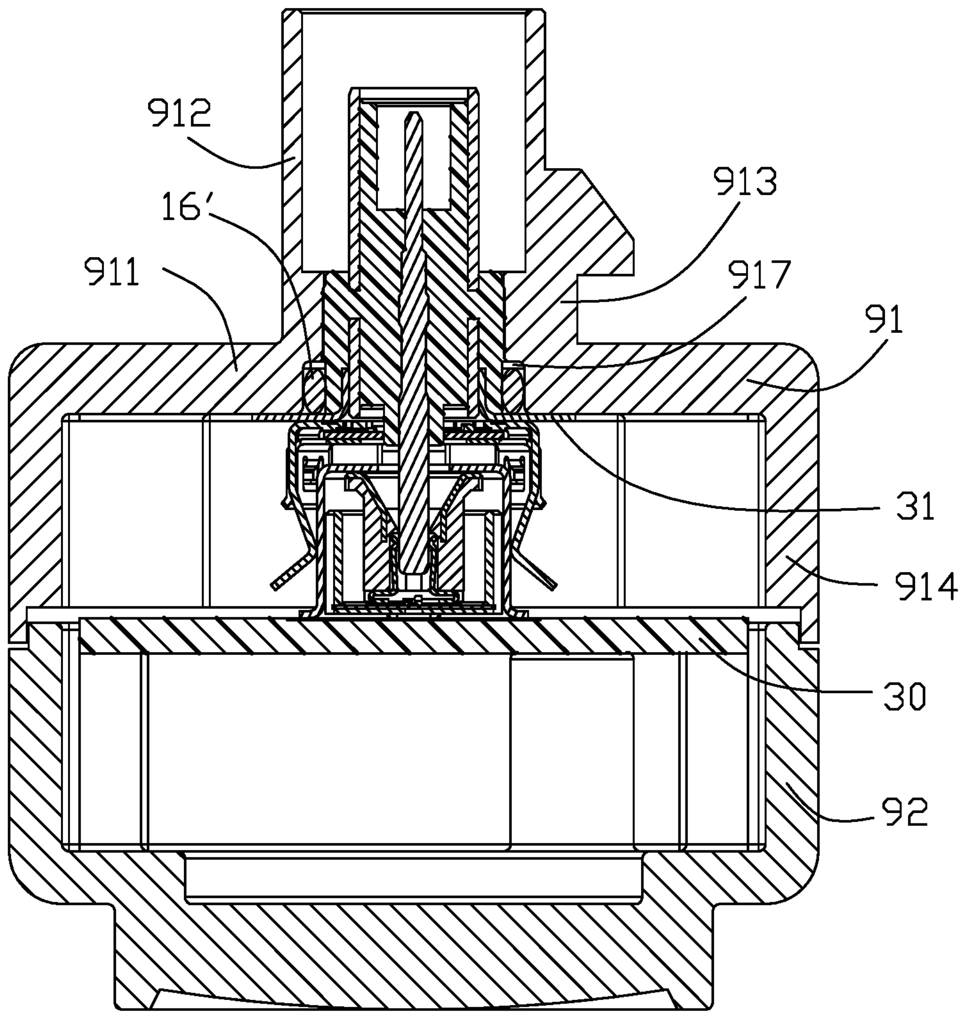
FIG. 15 is a cross-sectional view of the assembly of FIG. 11 along line A-A.
Figure 16:
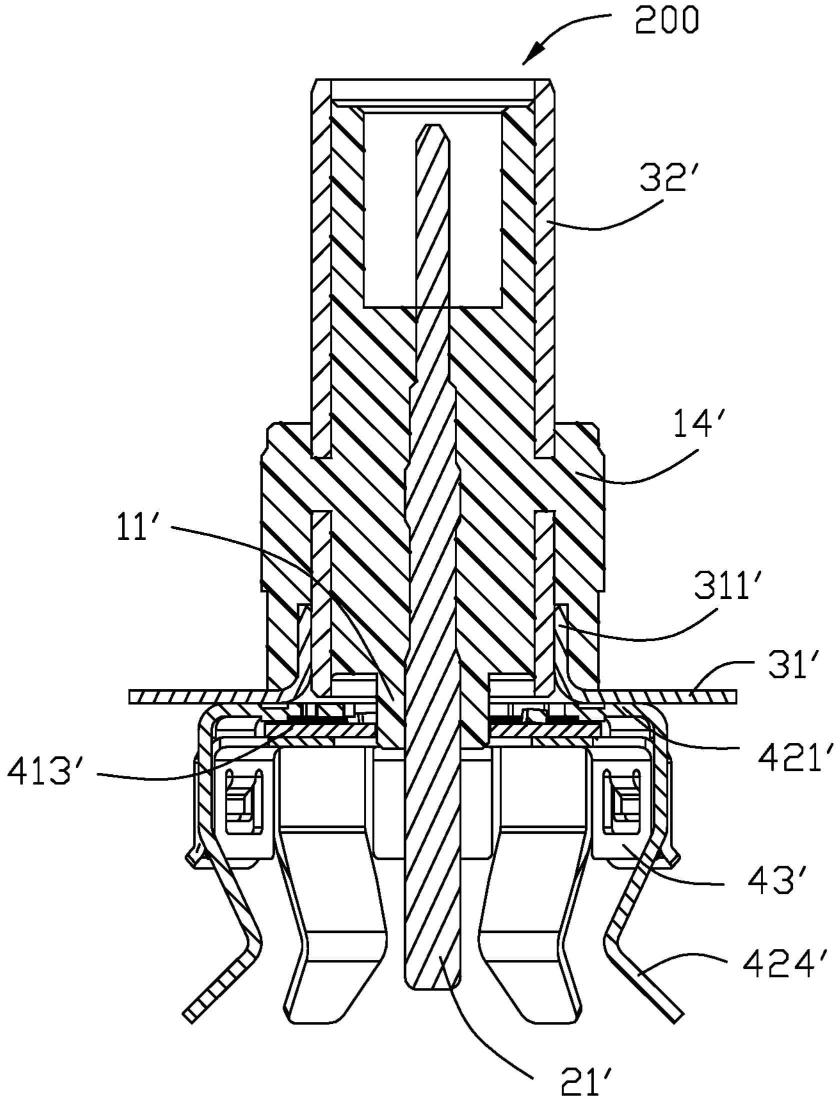
FIG. 16 is a cross-sectional view along line B-B in FIG. 13.
Figure 17:
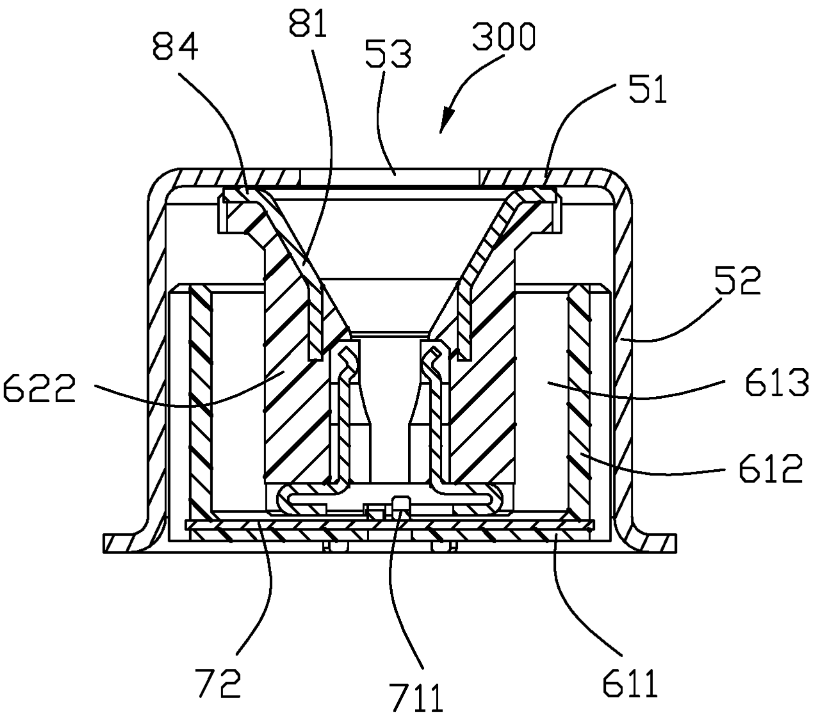
FIG. 17 is a cross-sectional view along line C-C in FIG. 13.

As seen in FIGS. 3 and 4, the outer conductor 3 is a unitary piece and includes a tubular part 32 from which the extension 31 extends radially outward. The insulating member 1 includes a base 13 and an outer body 14; holes are provided on the tubular part 32 of the outer conductor 3 for ease of molding the insulating member 1. The insulating member 1 further includes a plurality of separators 15 between adjacent parts of the extension 31 for sealing purpose. A sealing member 16 may be disposed between the outer body 14 and the separators 15.

Referring to FIGS. 5-8 and 16, the electrical connector 200 will be described in view of the electrical connector 100 and only those different structures will be described in detail while omitting those that are similar. An extension 33' is separately assembled to a tubular part 32' to constitute an outer conductor 3'. The extension 33' has a flat base 31' and an annular flange 311'. A corresponding fixing plate 41' has a base 413', a center hole 412', a plurality of legs 411', and a plurality of notches 414'. A shielding shell 43' is secured to the fixing plate 41' and has a plurality of flaps 432' located between corresponding outer arms 422' of an adapting shell 42' near junction of a ring 421' and the outer arms 422'. The adapting shell 42' includes a center hole 423' and plural flaps 425' with holes 427' for securing corresponding flaps 433' of the shielding shell 43'. The adapting shell 42' may improve a shielding effect around a contacting end 21' of a corresponding inner conductor 2'. The outer arms 422' are preferably in the form of spring arms 424' with leading guide portions.

Referring to FIGS. 9-10, 14-15, and 17, the mating electrical connector 300 is to be mounted on a printed circuit board (PCB) 30 and includes an outer housing 61, an inner housing 62 received in the outer housing 61, and an outer shell 5 secured to the outer housing 61 to movably confine the inner housing 62. The electrical connector 300 further includes a contact piece 72 secured to the outer housing 61, a contact 71 mounted to the inner housing 62, and a guiding funnel 8 secured to the inner housing 62. The contact 71 is kept in constant touch with the contact piece 72; the inner conductor 2' of the electrical connector 200 is adapted to mate with the contact 71 of the electrical connector 300. The outer housing 61 has a bottom 611, a peripheral wall 612, and a receiving chamber 613. The inner housing 62 has an inlet 621 for seating the guiding funnel 8. The guiding funnel 8 has a funnel part 81, a flange 82 secured to the inner housing 62, a cylinder 83, and plural protuberances 84 on the flange 82 in contact with a top 53 of the outer shell 5. The outer shell 5 is conductive and is soldered or otherwise secured to the PCB 30. The outer shell 5 a peripheral wall 52 and an opening 53 formed on the top 51 for the inner conductor 2' of the electrical connector 200 to enter. The inner housing 62 is movably confined in the outer housing 61 by the outer shell 5 to be moveable in a radial or lateral direction.

The contact piece 72 is secured at the bottom 611 of the outer housing 61 and is exposed to the receiving chamber 613. The contact 71 may be constructed of two separate parts each having a coupling portion 711 slidable over the contact piece 72 while keeping in constant touch therewith and a contacting arm 712 for engaging the contacting end 21' of the inner conductor 2'. The contact 71 is moveable together with the inner housing 62 to account for mis-alignment of the entering inner conductor 2' of the electrical connector 200. The contact piece 72 has a central disc 721 and a pair of side arms 722 serving as contact strip carriers during insert-molding operation; coupling portion 711 of the contact 71 is in constant slidable engagement with the central disc 721. The inner housing 62 has a tubular part 622 and a funnel part 623 receiving the funnel part 81 of the guiding funnel 8.

Referring to FIGS. 11-15, the electrical connector assembly 1000 further includes a casing 91 accommodating the electrical connector 200, e.g., as a Fakra adaptor, and a cover 92 accommodating the mating electrical connector 300, e.g., as a coaxial socket. The PCB 30 is fastened to the cover 92 by fasteners 93. A bushing 94 is placed between the casing 91 and the cover 92 and other fasteners are provided to fasten them together for a better seal. The casing 91 has a body 911 and a protrusion 912; the body 911 has portions 913 and 914 defining a receiving space for accommodating mated electrical connectors 200 and 300 as well as holes 915 and 916 with a step 917 therebetween to accommodate a sealing member 16'. The extension 33' of the outer conductor 3' is secured, e.g., by welding, to the portion 913.

The invention claimed is:

1. An electrical connector comprising:
an insulating member;
an inner conductor and an outer conductor both secured with the insulating member, the outer conductor including an extension;
a fixing plate secured to the extension of the outer conductor; and
an adapting shell movably confined between the outer conductor and the fixing plate to be moveable about the insulating member; wherein
the adapting shell comprises a ring, a plurality of outer arms, and a plurality of spring fingers inside the ring.

2. The electrical connector as claimed in claim 1, further comprising a shielding shell secured to the fixing plate, the shielding shell having a plurality of flaps located between the plurality of outer arms near a junction of the ring and the plurality of outer arms.

3. An electrical connector assembly comprising:
a first electrical connector including:
an insulating member;
an inner conductor and an outer conductor both secured with the insulating member, the outer conductor including an extension;
a fixing plate secured to the extension of the outer conductor; and
an adapting shell movably confined between the outer conductor and the fixing plate to be moveable about the insulating member; and
a second electrical connector including:
an outer housing and a contact piece secured to the outer housing;
an inner housing received in the outer housing, a contact mounted to the inner housing, and a guiding funnel secured to the inner housing; and
an outer shell secured to the outer housing to movably confine the inner housing while keeping the contact in constant touch with the contact piece; wherein
the inner conductor of the first electrical connector is adapted to mate with the contact of the second electrical connector.

4. The electrical connector assembly as claimed in claim 3, wherein the guiding funnel comprises a plurality of protuberances in contact with the outer shell.

5. The electrical connector assembly as claimed in claim 3, wherein the contact piece comprises a central disc, and the contact comprises a coupling portion in constant slidable engagement with the central disc.

6. An electrical connector comprising:
an insulating member;

an inner conductor and an outer conductor both secured with the insulating member, the outer conductor including an extension;

a fixing plate secured to the extension of the outer conductor;

an adapting shell movably confined between the outer conductor and the fixing plate to be moveable about the insulating member; and a shielding shell secured to the fixing plate, the shielding shell having a plurality of flaps located between the plurality of outer arms near a junction of the ring and the plurality of outer arms.

* * * * *